United States Patent [19]

Yoshimura et al.

[11] Patent Number: 4,621,129

[45] Date of Patent: Nov. 4, 1986

[54] PROCESS FOR PRODUCING MELTING-ANISOTROPIC, COPOLYMERIZED POLYESTER

[75] Inventors: Tamotsu Yoshimura, Machida; Masahiko Nakamura, Tokyo; Ken Honma, Yokohama, all of Japan

[73] Assignee: Mitsubishi Chemical Industries Limited, Tokyo, Japan

[21] Appl. No.: 800,127

[22] PCT Filed: Feb. 28, 1985

[86] PCT No.: PCT/JP85/00094

§ 371 Date: Oct. 31, 1985

§ 102(e) Date: Oct. 31, 1985

[87] PCT Pub. No.: WO85/03941

PCT Pub. Date: Sep. 12, 1985

[30] Foreign Application Priority Data

Mar. 6, 1984 [JP] Japan .................................. 59-42266

[51] Int. Cl.$^4$ ...................... C08G 63/60; C08G 63/76
[52] U.S. Cl. .................................... 528/176; 525/419; 525/437; 525/447; 528/190
[58] Field of Search ...................... 525/419, 437, 447; 528/176, 190

[56] References Cited

U.S. PATENT DOCUMENTS

| | | | |
|---|---|---|---|
| 3,778,410 | 12/1973 | Kuhfuss et al. | 525/437 |
| 3,804,805 | 4/1974 | Kuhfuss et al. | 525/437 |
| 4,035,356 | 7/1977 | Jackson, Jr. et al. | 525/437 |
| 4,393,191 | 7/1983 | East | 528/207 |
| 4,542,203 | 9/1985 | Ueno et al. | 528/126 |
| 4,560,740 | 12/1985 | Ueno et al. | 528/125 |

*Primary Examiner*—Lucille M. Phynes
*Attorney, Agent, or Firm*—Oblon, Fisher, Spivak, McClelland & Maier

[57] ABSTRACT

A process for producing a melting-anisotropic copolymerized polyester containing an alkylene terephthalate component, which comprises reacting a starting polyester composed of a dicarboxylic acid and a diol with an oxyaromatic carboxylic acid to form a copolymerized oligomer, then conducting acylating reaction by the addition of an acylating agent and further conducting polycondensating reduction thereby producing a melting-anisotropic, copolymerized polyester having a logarithmic viscosity of at least 0.2 dl/g. According to this process, a polyester of excellent physical property can be obtained at a good production efficiency.

4 Claims, No Drawings

PROCESS FOR PRODUCING MELTING-ANISOTROPIC, COPOLYMERIZED POLYESTER

DESCRIPTION

1. Technical Field

This invention relates to a novel process for producing a melting-anisotropic, copolymerized polyester and, more specifically, relates to a novel process for producing a melting-anisotropic, copolymerized polyester without sublimation of starting monomer upon preparation, which the process is capable of improving the production efficiency, of producing products in the inexpensive material cost and of obtaining products with improved physical properties.

2. Background Art

A demand has been increased in recent years for those materials excellent in durability, heat-resistance and chemical-resistance irrespective of fibers, films or shaped articles. Although polyesters have now been generally adopted for wide uses in ordinary shaped articles, most of polyesters have not yet been suitable to the use requiring high strength since polyesters are inferior in the mechanical physical properties such as bending modulus. In order to improve the mechanical physical properties, while it has been known a method of blending reinforcing agents such as calcium carbonate or glass fiber, in this method the specific gravity of the material thereof increases thereby reducing the merit of light weight which is the advantage of plastics, and this method causes violent abrasion and the like to molding machines upon molding resulting in many practical problems. Melting-anisotropic polyester has become to attract one's attention in recent years as a polyester requiring no reinforcing members and suitable to the use for which a high strength is demanded.

Upon molecular design of such a melting-anisotropic polyester, a rigid molecular structure composed of paracoupling aromatic groups is basically adopted and, based thereon, means such as copolymerization, introduction of substituents to aromatic groups and partial introduction of soft ingredients has been adapted for lowering the melting point to facilitate the molding process. An alkylene therephthalate is particularly effective as the soft ingredient for improving the moldability and the alkylene terephthalate is introduced as a constitutional ingredient of a melting-anisotropic polyester, for example, in Japanese Patent Publication No. 56-18016 and The Journal of Polymer Science, Polymer Chemistry, Edition, vol. 14 (1976), page 2043, etc.

It has, however, been found that the melting-anisotropic, copolymerized polyesters prepared by these production processes have the following drawbacks.

That is, although as the raw material a polyalkylene ester such as polyethylene terephthalate, etc. and an acyloxy aromatic carboxylic acid are reacted to produce a melting-anisotropic, copolymerized polyester in these processes, since the acyloxy aromatic carboxylic acid used as the starting material is highly evaporizing (sublimating) and, further, due too the reactivity of the carboxylic acid itself in the reaction system, a relatively large amount of the monomer (the carboxylic acid) is present in the reaction system thereby causing sublimation during production to clog the pipelines in the production apparatus by the solidification of the sublimates and reduce the productivity, and as a result the composition of the resultant polymer is less stabilized. Further, since the acyloxy aromatic carboxylic acid is prepared by acylating an oxyaromatic carboxylic acid, it is more expensive than the oxyaromatic carboxylic acid. Furthermore, since the liquid crystalline polyester prepared by contacting the polyalkylene terephthlate with the acyloxy aromatic carboxylic acid has a high anisotropy in the physical property, there is a drawback that the use of the shaped articles such as fibers, films or three-dimensional structures is limited. Disclosure of the Invention The present inventors have eagerly studied for removing the foregoing drawbacks and, as a result, have attained this invention.

Namely, this invention provides a process for producing a melting-anisotropic, copolymerized polyester containing an alkylene terephthalate ingredient, which comprises reacting 95 to 5 mol % of starting polyester composed of a dicarboxylic acid and a diol having repeating units represented by the general formula:

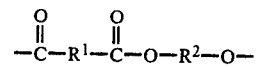

where $R^1$ represents a divalent aromatic radical of 6 to 20 carbon atoms or a divalent cycloaliphatic radical of 4 to 20 carbon atoms and $R^2$ represents a divalent aliphatic radical of 2 to 20 carbon atoms, with 5 to 95 mol % of an oxyaromatic carboxylic acid represented by the general formula:

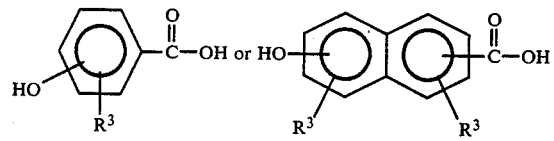

where $R^3$ represents a hydrogen atom, a halogen atom, an alkyl or alkoxy group of 1 to 4 carbon atoms, to form a copolymerized oligomer, then adding an acylating agent to conduct an acylating reaction and, further, conducting polycondensation reaction to increase the logarithmic viscosity thereby producing copolymerized polyester having a logarithmic viscosity of at least 0.2 dl/g.

BEST MODE OF CARRYING OUT THE INVENTION

In the production process according to this invention, an oxyaromatic carboxylic acid is reacted with a starting polyester, in which no substantial sublimation occurs since this carboxylic acid is less evaporizing (sublimation) as compared with the acyloxy aromatic carboxylic acid described above and monomer (oxyaromatic carboxylic acid) hardly remains in this reaction system upon polycondensation as compared with the method described above using the acyloxy aromatic carboxylic acid. Accordingly, no clogging occurs in the pipeline system of the production apparatus thereby significantly improving the production efficiency. Further, it is not only advantageous in the material cost due to the use of inexpensive oxyaromatic carboxylic acid but also can provide a polymer of a composition substantially equal to the charged composition since there is no monomer sublimation. Furthermore, according to the present production process, since the oxyaromatic carboxylic acid is used, the self-condensation upon melting is not caused different from the case of using the acyloxy aromatic carboxylic acid and, therefore, the units

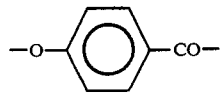

are uniformly incorporated into the copolymer chain whereby a homogenous polymer containing no insoluble materials can be obtained. Further, also in view of the physical property, an excellent melting-anisotropic polyester showing lower temperature-dependency of the melt viscosity, excellent in the physical property and relatively less anisotropic property in the physical property can be obtained.

The starting polyester used in this invention comprises a recurring unit represented by the general formula:

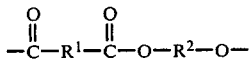

where $R^1$ represents a divalent aromatic radical of 6 to 20 carbon atoms or a divalent cycloaliphatic radical of from 4 to 20 carbon atoms and $R^2$ represents a divalent aliphatic radical of 2 to 20 carbon atoms. Either polymer or oligomer can be used so long as it has the above-mentioned structure and, while there is no particular restriction for the logarithmic viscosity thereof, it is preferably not less than 0.03 dl/g and, particularly, not less than 0.05 dl/g.

The starting polyester in the most preferred embodiment for use in this invention is a polyalkylene terephthalate or the oligomer thereof and, concretely, polyethylene terephthalate and polybutadiene terephthalate are preferred, and further polyethylene terephthalate and the oligomer thereof are particularly preferred. While the starting polyester having the recurring structural unit as described above may be prepared by the reaction of a dicarboxylic acid with a diol, any of those materials, for example, from the following dicarboxylic acids and diols as the starting material can be used. As examples of the dicarboxylic acids usable for constituting the starting polyester, for example, terephthalic acid, isophthalic acid, 4,4-diphenyl dicarboxylic acid, bis(4-carboxylphenyl) ether, 1,2-bis(4-carboxylphenoxy)ethane, 1,5-, 2,6- or 2,7-naphthalene dicarboxylic acid, succinic acid, adipic acid, suberic acid, azelaic acid, sebacic acid, dodecane di-carboxylic acid, para (or meta) xylylene dicarboxylic acid and the like may be mentioned.

Further, as examples of the diols usable for constituting the starting polyester, for example, ethylene glycol, diethylene glycol, 1,2-propylene glycol, 2,4-dimethyl-2-ethylenehexane-1,3-diol, 2,2,4-trimethyl-1,3-pentanediol, 2,2-dimethyl-1,3-propanediol, 1,3-butandiol, 1,4-butandiol, 1,5-pentanediol, 1,6-hexanediol, 2,2,4-trimethyl-1,6-hexanediol, polyethylene glycol (molecular weight : 600-6,000), polytetramethylene glycol (molecular weight : 600-6,000) and the like may be mentioned.

The starting polyester in this invention can be prepared by a general process well-known in the field of the art.

The oxyaromatic carboxylic acid used in this invention is represented by the general formula:

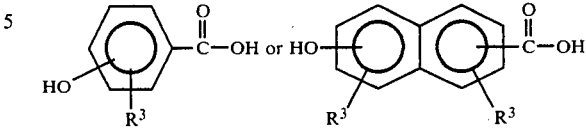

where $R^3$ represents a hydrogen atom, a halogen atom or an alkyl or alkoxy group of 1 to 4 carbon atoms. Aromatic compounds referred to as para-directed aromatic compound have often been selected as the oxyaromatic carboxylic compound for basically constituting the rigid-linear portion of the resultant melting-anisotropic polyester and, for example, paraoxybenzoic acid, 2-oxy-6-naphthoic acid, 1-oxy-5-naphthoic acid, 1-oxy-4-naphthoic acid may be used. However, meta- or orthodirected oxyaromatic carboxylic acid compounds may be used so long as they do not impair the melting-anisotropic property of the formed copolymerized polyester. Acetic anhydride is preferred as the acetylating agent.

The ratio of the starting polyester (converted as the alkylene terephthalate unit) to the oxyaromatic carboxylic acid used in this invention is in the range of 5:95 to 95:5 by mol % and, preferably, 30:70 to 70:30 by mol %.

The production process according to this invention is as described below.

At first, a starting polyester and an oxyaromatic carboxylic acid compound are introduced in a reaction vessel to conduct an ester exchanging reaction by heating under a normal pressure as the first step. The heating temperature is selected to between 150°-350° C., preferably, between 200°-300° C. and, particularly preferably, between 200°-290° C. In the case of higher than 350° C., decomposition of polyalkylene terephthalate or its oligomer may be caused and in the case of lower than 150° C., the reaction rate is significantly reduced thereby requiring a longer period of time. The reaction is desirably conducted until the residual amount of the oxyaromatic carboxylic acid compound is reduced usually to less than 70 mol %, preferably, to less than 50 mol % and, particularly preferably, to less than 40 mol % based on the charged amount.

Then, n acylating agent such as acetic anhydride, acetyl chloride, phenyl acetate, propionic anhydride and butylic anhydride is added and the reaction is proceeded under the normal pressure as the second step. As the acylating agent, acetic anhydride is preferred. As the amount of the acylating agent, the ratio usually employed is not less than 0.7 mol, preferably, not less than 0.8 mol and, particularly preferably, not less than 1.0 mol per one mol of the oxyaromatic carboxylic acid used in the first step. The reaction temperature is 150° to 350° C. and, preferably, 200° to 300° C. The degree of the acylation in the second step may be such that the amount (molar ratio) of the formed acyl groups as determined from the amount of the unreacted acylating agent is not less than 0.7, preferably, not less than 0.8 and, particularly preferably, not less than 0.85 based on the amount of the OH groups before the reaction at the second step.

Then, as the third step, after distilling the most portion of the carboxylic acid such as acetic acid out of the reaction system by optionally increasing the temperature of the reaction system, polymerization is initiated while gradually reducing the pressure of the reaction system and the polymerizing reaction is conducted at a reduced pressure usually below 10 Torr while distilling the formed carboxylic acid such as acetic acid out of the system. The logarithmic viscosity is increased through the polymerizing reaction to obtain a copolymerized polyester having a logarithmic viscosity of not less than 0.2 dl/g, preferably, not less than 0.3 dl/g and, more preferably, 0.4 to 4 dl/g.

In each of the steps, the reaction can be conducted efficiently by the use of an adequate catalyst. A tin compound (for example, stannous acetate) and the like is effective for the reaction at the first step, an amine compound and an acetic acid salt such as potassium acetate or sodium acetate are effective for the reaction at the second step, and a zinc compound (for example, zinc acetate) and the like are effective for the reaction at the third step. The amount of the catalyst to be added is 50 to 5000 ppm, preferably, 200 to 2000 ppm based on the formed polymer.

This invention will now be described concretely referring to examples but this invention is no way limited to the following examples unless it does not exceed the gist thereof.

The logarithmic viscosity is a quotient of the natural logarithmic value of a relative viscosity divided by the concentration of the sample solution and it was measured by using a mixed solvent of tetrachloro ethane/phenol=1/1 (weight ratio) as the viscosity solvent in this measurement at a concentration of 0.5 g/dl at 30° C. The melting-anisotropic property was judged by the absence or presence of the optical anisotropy in the molten state. "Nikon Polarizing Microscope" Model POH equipped with a heat-stage of Zeiss AG was used as the device.

The obtained polymer was extruded in the form of a strand-like article by an extruder to determine the sonic modulus (ASTM F89-68). The sonic velocity (v) propagating through the strand-like polymer was measured by using a Dynamic Modulus Tester PPM-5R manufactured by Toyo Seiki Seisakusho K.K. and the value for the sonic module was calculated by the Rapurasu's equation:

$$E = \rho v^2$$

where
E: Sonic modulus
$\rho$: density (using density gradient tube)
v: sonic velocity The composition was measured by the proton NMR.

EXAMPLE 1

After charging 76.8 g (0.4 mol) of polyethylene terephthalate ($\eta$inh 0.64 dl/g), 82.8 g (0.6 mol) of para-oxybenzoic acid and 0.05 g of di-n-butyl-tin oxide to a polymerizing tube provided with a stirrer and purging for three times with nitrogen gas, the polymerizing tube was immersed in an oil bath at 275° C. and stirring was conducted under a nitrogen gas stream for one hour. The residual amount of the para-oxybenzoic acid was 22 mol % based on the charged amount thereof. Then, the bath temperature was lowered to 230° C. and after adding 92 g (0.9 mol) of acetic anhydride thereto stirring was conducted under a nitrogen gas stream for 1.5 hours. The degree of acetylation was 91 mol % based on the amount of OH groups in the product after the reaction at the first step.

Then, after elevating the bath temperature to 275° C. again while distilling out acetic acid, stirring was conducted under vacuum of 0.5 Torr for 7 hours to complete the polymerization.

The polymer had $\eta$inh of 0.44 dl/g and the temperature region of the melting-anisotropy was 120° to 340° C. The composition of the resultant polymer was 40 mol % of the polyethylene terephthalate component and 60 mol % of the para-oxybenzoic acid component, which was identical with the charged composition. Further, the solution for measuring the viscosity was completely transparent and the presence of insoluble materials was not observed. Furthermore, sonic modulus was 13 GPa and the fracture-section of the strand-like test piece exhibited weak bamboo-like texture.

EXAMPLE 2

After charging 38.4 g (0.2 mol) of a polyethylene terephthalate oligomer ($\eta$inh 0.10 dl/g), 41.4 g (0.3 mol) of para-oxybenzoic acid and 0.024 g of stannous acetate oxide to a polymerizing tube provided with a stirrer and purging for three times with nitrogen gas, the polymerizing tube was immersed in an oil bath at 240° C. and stirring was conducted under a nitrogen gas stream for one hour. The residual amount of the para-oxybenzoic acid was 20 mol % based on the charged amount. Then, after adding 46 g (0.45 mol) of acetic anhydride thereto stirring was conducted for 1.5 hours. The degree of acetylation was 90 mol % based on the amount of OH groups in the product after the reaction at the first step. After elevating the bath temperature to 275° C. while distilling out acetic acid, and acetic acid was then distilled out completely under vacuum of 5 Torr. Further, the polymerization system was recovered to the normal pressure with nitrogen gas, and stirring was conducted under vacuum of 0.2 Torr for 6 hours to complete the polymerization after addition of 0.044 g of zinc acetate dihydrate. The polymer had $\eta$inh of 0.70 dl/g and the temperature region of the melting-anisotropy was 110° to 340° C. The composition of the resultant polymer was 40 mol % of the polyethylene terephthalate component and 60 mol % of the para-oxybenzoic acid component, which was identical with the charged composition. Further, the solution for measuring the viscosity was completely transparent and the presence of insoluble materials was not observed. Furthermore, sonic modulus was 10 GPa and the fracture-section of the strand-like test piece exhibited weak bamboo-like texture. Then, the melt viscosity was measured in an ordinary manner by using Koka-Type Flow Tester in order to examine the temperature dependency of the melt viscosity of the resultant polymer. The viscosity at represents the shearing $\dot{\gamma}=10^3$/sec and $\dot{\gamma}=10^4$/sec ($\dot{\gamma}$ represents the shearing velocity) were respectively about 650 poise and 250 poise (at 250° C.) and about 360 poise and 230 poise (at 300° C.).

COMPARATIVE EXAMPLE 1

After charging 76.8 g (0.4 mol) of polyethylene terephthalate ($\eta$inh 0.64 dl/g) and 108 g (0.6 mol) of para-acetoxybenzoic acid to a polymerizing tube provided with a stirrer and purging for three times with a nitrogen stream, the polymerizing tube was immersed in an oil bath at 275° C. and stirring was conducted under a nitrogen gas stream for one hour whereby most portion of acetic acid was distilled off. The polymer had $\eta$inh of 0.65 dl/g and the temperature region of the melting-anisotropy was 120° to 340° C.

The composition of the resultant polymer was 44 mol % of the polyethylene terephthalate component and 56 mol % of para-oxybenzoic acid component, which was not identical with the charged composition. Further, the presence of a little amount of insoluble materials was recognized in the solution for measuring the viscosity. Furthermore, sonic modulus was 13 GPa and the fracture-section of the strand-like test piece exhibited strong bamboo-like texture.

COMPARATIVE EXAMPLE 2

After charging 38.4 g (0.2 mol) polyethylene terephthalate ($\eta$inh 0.10) and 54.0 g (0.3 mol) of para-acetoxybenzoic acid to a polymerizing tube provided with a stirrer and purging for three times with nitrogen gas, the polymerizing tube was immersed in an oil bath at 275° C. and stirring was conducted under a nitrogen gas stream for one hour whereby most portion of acetic acid was distilled out. Then, after reducing to vacuum of 0.5 Torr, stirring was conducted for 5 hours to complete the polymerization. The polymer had $\eta$inh of 0.67 and the temperature region of the melting-anisotropy was 110° to 340° C. Further, sonic modulus was 13 GPa and the fracture-section of the strand-like test piece exhibited fine fibrous texture as seen in the section of bamboo. Further, the composition of the resultant polymer was 45 mol % of the polyethylene terephthalate component and 55 mol % of para-acetoxybenzoic acid component, which was not identical with the charged composition. Further, the presence of a little amount of insoluble material was observed in the solution for measuring the viscosity.

EXAMPLE 3

The reaction was carried out in the same procedures as in Example 2 except for the polymerization of 5 hours under vacuum. As a result, a polymer having $\eta$inh=0.69 dl/g was obtained. The bending modulus, bending strength, tensile strength and elongation at break were measured for the obtained polymer.

The measurement was conducted using a J5S type Injection Molding Machine of Nippon Seiko K.K. at a cylinder temperature of 250° C., an injection pressure of 50 kg/cm² (gage pressure) and die temperature of 50° C., by molding a rectangular test piece of 40 mm in length, 6 mm in width and 1 mm in thickness for measuring the bending physical property and molding a dumbbell-shaped test piece of 25 mm in length, 3.2 mm in width and 1 mm in thickness in the linear portion and with 3 R in the R portion for measuring the tensile physical property, at a speed of 1 mm/min and a distance between support points of 30 mm for the bending test and at a speed of 5 mm/min and a distance between chucks of 30 mm for the tensile test by using Tensilon UTM-5T type tester of Toyo Boldwin K.K. The results are shown in Table 1.

COMPARATIVE EXAMPLE 3

The polymerization was carried out in the same manner as in Comparative Example 1 while using 38.4 g (0.20 mol) of polyethylene terephthalate ($\eta$inh=0.64 dl/g) and 54.1 g (0.30 mol) of para-acetoxybenzoic acid under vacuum for 6 hours to obtain a polymer having of $\eta$inh=0.61 dl/g. The mechanical physical properties of the polymer were measured in the same procedures as in Example 3. The results are shown in Table 1.

TABLE 1

| | Bending modulus kg/mm² | | | Bending strength kg/mm² | | | Tensile strength (kg/mm²) | Elongation at Break (%) |
|---|---|---|---|---|---|---|---|---|
| | MD | TD | MD/TD | MD | TD | MD/TD | | |
| Example 3 | 1360 | 330 | 4.0 | 13.2 | 7.6 | 1.7 | 19.6 | 5.2 |
| Comparative Example 3 | 1250 | 232 | 5.4 | 13.6 | 5.0 | 2.7 | 12.6 | 4.3 |

Note
MD: direction of flow
TD: direction in perpendicular to flow

We claim:

1. A process for producing a melting-anisotropic, copolymerized polyester containing an alkylene terephthalate component, which comprises reacting 95 to 5 mol % of a starting polyester composed of a dicarboxylic acid and a diol having of recurring units represented by the general formula:

$$-\overset{O}{\underset{\|}{C}}-R^1-\overset{O}{\underset{\|}{C}}-O-R^2-O-$$

where $R^1$ represents a divalent aromatic radical of 6 to 20 carbon atoms or a divalent cycloaliphatic radical of 4 to 20 carbon atoms, and $R^2$ represents a divalent aliphatic radical of 2 to 20 carbon atoms, with from 5 to 95 mol % of an oxyaromatic carboxylic acid represented by the general formula:

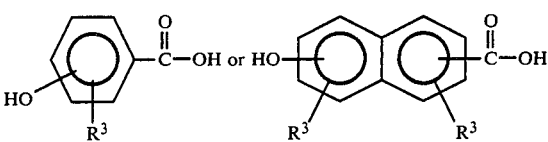

where $R^3$ represents a hydrogen atom, a halogen atom, an alkyl or alkoxy group of 1 to 4 carbon atoms to form a copolymerized oligomer, then conducting acylating reaction by the addition of an acylating agent and, further conducting polycondensating reaction in order to increase the logarithmic viscosity thereby producing a copolymerized polyester having a logarithmic viscosity of at least 0.2 dl/g.

2. The process for producing the melting-anisotropic, copolymerized polyester as defined in claim 1, wherein a polyalkylene terephthalate or the oligomer thereof is used as the starting polyester.

3. The process for producing the melting-anisotropic, copolymerized polyester as defined in claim 1, wherein para-oxybenzoic acid, 2-oxy-6-naphthoic acid, 1-oxy-5-naphthoic acid or 1-oxy-4-naphthoic acid is used as the oxyaromatic carboxylic acid.

4. The process for producing the melting-anisotropic, copolymerized polyester as defined in claim 1, wherein acetic anhydride is used as the acylating agent.

* * * * *